United States Patent [19]

Roszinski et al.

[11] 3,717,692
[45] Feb. 20, 1973

[54] PROCESS FOR THE MANUFACTURE OF SALT MIXTURES OF ALKALI METAL SALTS OF O,O-DIALKYLDITHIO-PHOSPHORIC ACIDS

[75] Inventors: Hilmar Roszinski, Kendenich near Cologne; Hermann Schmadel, Hofheim/Taunus, both of Germany

[73] Assignee: Knapsack Aktiengesellschaft, Knapsack bei Koln, Germany

[22] Filed: Sept. 14, 1970

[21] Appl. No.: 72,177

[30] Foreign Application Priority Data

Oct. 24, 1969 Germany..................P 19 53 614.2

[52] U.S. Cl. ..................260/987, 252/61, 260/981
[51] Int. Cl..................................................C07f 9/16
[58] Field of Search.....252/61, 32.7 E; 260/987, 990

[56] References Cited

UNITED STATES PATENTS

| | | | |
|---|---|---|---|
| 3,086,653 | 4/1963 | Booth | 252/61 X |
| 1,868,192 | 7/1932 | Buchanan | 252/61 |
| 2,919,025 | 12/1959 | Booth et al. | 252/61 X |
| 2,983,742 | 5/1961 | Boba et al. | 260/987 X |
| 3,428,662 | 2/1969 | Millendorf et al. | 260/987 X |
| 3,317,040 | 5/1967 | Booth | 252/61 X |

*Primary Examiner*—Herbert B. Guynn
*Attorney*—Connolly & Hutz

[57] ABSTRACT

Production of salt mixtures comprised of alkali metal salts of O,O-dialkyldithiophosphoric acids of the general formula $(RO)_2PS(SMe)$, in which Me stands for the alkalies sodium or potassium, and R stands for identical or different alkyl radicals of branched or unbranched linear hydrocarbon compounds having from one to 18 carbon atoms, and of corresponding alkali metal carbonates by reacting an O,O-dialkyldithiophosphoric acid with an excess of carbonates of the said alkalies Me. The salt mixtures are more particularly produced by introducing into the O,O-dialkyldithiophosphoric acid at least one of the above alkali metal carbonates so as to produce a mixture of alkali metal salt of O,O-dialkyldithiophosphoric acid and excess alkali metal carbonate with an overall alkali metal carbonate content of between 10 and 30 weight percent, and subjecting the resulting reaction product to finishing treatment.

5 Claims, No Drawings

PROCESS FOR THE MANUFACTURE OF SALT MIXTURES OF ALKALI METAL SALTS OF O,O-DIALKYLDITHIO-PHOSPHORIC ACIDS

The present invention relates to the production of salt mixtures comprising alkali metal salts of O,O-dialkyldithiophosphoric acids of the general formula $(RO)_2PS(SMe)$, in which Me stands for the alkalies sodium or potassium, and R stands for identical or different alkyl radicals of branched or unbranched linear hydrocarbon compounds having from one to 18 carbon atoms, and corresponding alkali metal carbonates by reacting an O,O-dialkyldithiophosphoric acid with an excess of a carbonate of the above alkalies Me.

U.S. Pat. No. 1,868,192 describes a process for the manufacture of alkali metal salts of dialkyldithiophosphoric acids, with the resultant formation of products that even to-day are commercially available. As described therein, the alkali metal salts of dialkyldithiophosphoric acids are predominantly produced with the use of a considerable excess of alkali metal carbonate. The compounds are more particularly produced by the addition of acid to the carbonate.

As a result of the considerable excess of alkali metal carbonate used, the products so made have a relatively low content of active alkali metal dithiophosphates therein. When it is desirable to produce final products having a higher content of active material therein, it is necessary by the alternate addition of further dithiophosphoric acid and successive drying of the reaction product to gradually increase the concentration of alkali metal dithiophosphates therein. For the acid, it is necessary to be added very reluctantly and for the resulting product to be dried for several hours, following each addition to acid. The disadvantages inherent to this process are obvious. They reside in great expenditure with respect to apparatus, such as reactors, intermediate containers, mixers, driers, mills or similar devices, and time.

The present invention now unexpectedly provides a process which enables powdery, soluble alkali metal salts of dialkyldithiophosphoric acids to be produced in rapid and technically easy manner with the use of a slight excess of alkali metal carbonate, the alkali metal salts, which are free from lumps, being obtained in the form of particles showing the particle-size distribution necessary for commercialization. This commercially very attractive process comprises more particularly introducing into the O,O-dialkyl-dithiophosphoric acid at least one of the above alkali metal carbonates so as to produce a mixture of alkali metal salt of O,O-dialkyldithiophosphoric acid and excess alkali metal carbonate with an overall alkali metal carbonate content of between 10 and 30 weight percent, and subjecting the mixture to finishing treatment.

A preferred feature of the present process comprises first preparing the O,O-dialkyldithiophosphoric acid by reacting phosphorus pentasulfide with an alcohol of the type ROH, the alcohol being used in an excess of between 5 and 15 weight percent, based on the stoichiometric quantity needed to produce the O,O-dialkyldithiophosphoric acid, then heating the resulting crude O,O-dialkyldithiophosphoric acid under reduced pressure, and introducing alkali metal carbonate into the acid so produced, which may optionally be left in the reactor in which it is produced.

The vacuum treatment of the crude acid should preferably be effected over a period of between 0.5 and 4 hours, under a pressure of between 1 and 200 mm Hg, and at temperatures of between 20 and 120°C.

The vacuum treatment of the crude acid is more preferably effected under a pressure of between 25 and 100 mm Hg and at temperatures of between 40 and 80°C, the resulting reaction product being finally maintained over a period of between 0.5 and 2 hours at temperatures of between 20° and 100° C under a pressure of between 1 and 100 mm Hg. The alkali metal carbonate is most conveniently introduced into the O,O-dialkyldithiophosphoric acid as rapidly as the foaming carbonate permits.

A further preferred feature of the present invention comprises neutralizing the O,O-dialkyldithiophosphoric acid with an excess of alkali metal carbonate so as to produce a reaction product comprising the alkali metal salt of the acid and excess alkali metal carbonate, with an overall alkali metal carbonate concentration of between 20 and 25 weight percent.

Salt mixtures containing less than 70 weight percent alkali metal O,O-dialkyldithiophosphates may be produced by the introduction, with agitation, of suitable quantities of solid inert addends into the powdery reaction product.

The addends mixed into the powdery reaction product include crystalline alkali metal carbonates and common salt, for example.

The overall reaction may be carried out using a single reactor, provided that the reactor is a vacuum mixer.

The process of the present invention enables alkali metal dialkyldithiophosphates with a concentration of up to 90 weight percent, the balance being alkali metal carbonate, to be produced in dry, pulverulent and readily soluble form. The use of solvents is unnecessary. The addition of carbonate in an excess of more than 30 weight percent, based on the final product, to effect neutralization of the dialkyldithiophosphoric acid, has unexpectedly been found to entail longer periods for pulverization. It is therefore technically and commercially good practice to prepare products having a high content of alkali metal dialkyldithiophosphates and blend them later, inside the same mixer, with solid addends, so as to establish a given dithiophosphate content therein, according to requirements.

Various exemplary embodiments of the present process are illustrated in the following Examples, without limiting the invention thereto.

EXAMPLE 1

Sodium-O,O-di-sec.butyldithiophosphate.

50 kg phosphorus pentasulfide were introduced into a vacuum mixer and reacted therein within 30 minutes with 73 kg secondary butanol. The reaction was carried out with agitation, under reflux, at atmospheric pressure and at 65° C. Hydrogen sulfide which evolved during the reaction was destroyed in customary manner. The reaction product obtained was kept for a further 30 minutes at 65° C at atmospheric pressure. The crude dialkyldithiophosphoric acid was then treated for 1 hour at 80° C under 25 mm Hg to distil off matter volatile under these conditions. The resulting product was cooled down to 30° C and 50 kg anhydrous, powdery sodium carbonate was introduced thereinto at atmospheric pressure as rapidly as the initial formation of foam did permit. The resulting reaction product, which had a pulpy consistency, was treated in the mixer at 80° C under a pressure of between 100 and 25 mm Hg and transformed within 90 minutes into a white loose powder. The powder was found to contain 78 weight percent sodium-0,0-di-sec.butyldithiophosphate; the balance of 22 weight percent substantially was sodium carbonate.

The powder so made was rapidly and homogeneously mixed in the same mixer at atmospheric pressure with a further 58 kg sodium carbonate and altogether 195 kg of a product containing 55 weight percent sodium-0,0-di-sec. butyldithiophosphate were obtained.

EXAMPLE 2

Sodium-0,0-diethyldithiophosphate.

89 kg phosphorus pentasulfide were introduced into a vacuum mixer and reacted therein within 3 hours with 81 kg ethyl alcohol. The reaction was carried out with agitation, under reflux, at atmospheric pressure and at 40° C. Hydrogen sulfide which evolved during the reaction was destroyed in customary manner. The reaction product obtained was kept for a further 30 minutes at 40° C at atmospheric pressure. The crude dialkyldithiophosphoric acid was then treated for 1 hour at 40° C under 25 mm Hg to distil off matter volatile under these conditions. Following this, the resulting product was cooled down to about 30° C and 75 kg anhydrous, powdery sodium carbonate were introduced thereinto at atmospheric pressure as rapidly as the initial formation of foam did permit. The resulting reaction product, which had a pulpy consistency, was treated in the mixer at 70° C under a pressure of between 100 and 25 mm Hg and transformed within 90 minutes into a white loose powder. The powder was found to contain 82 weight percent sodium-0,0-diethyldithiophosphate; the balance of 18 weight percent substantially was sodium carbonate. The yield was 195 kg.

EXAMPLE 3

Potassium-0,0-diamyldithiophosphate.

222 grams phosphorus pentasulfide were introduced into a vacuum mixer and reacted therein within 30 minutes with 387 grams amyl alcohol. The reaction was carried out with agitation, under reflux, at atmospheric pressure and at 65° C. Hydrogen sulfide which evolved during the reaction was destroyed in customary manner. The reaction product obtained was kept for a further 30 minutes at 65° C at atmospheric pressure. The crude dialkyldithiophosphoric acid was then treated for 1 hour at 80° C under 15 mm Hg to distil off matter volatile under these conditions. Following this, the resulting product was cooled down to about 30° C and 260 grams anhydrous, powdery potassium carbonate were introduced thereinto at atmospheric pressure as rapidly as the initial formation of foam did permit. The resulting reaction product, which had a pulpy consistency, was treated in the mixer at 80° C under a pressure of between 100 and 25 mm Hg and transformed within 2 ½ hours into a white loose powder. The powder was found to contain 82 weight percent potassium-0,0-diamyldithiophosphate; the balance of 18 weight percent substantially was potassium carbonate. The yield was 700 grams.

We claim:

1. A process for the manufacture of salt mixtures in powdery form comprised of alkali metal salts of 0,0-dialkyldithiophosphoric acids of the general formula $(RO)_2PS(SMe)$ in which Me stands for the alkalies sodium or potassium, and R stands for identical or different branched or linear alkyl radicals having from 1 to 18 carbon atoms, and of corresponding alkali metal carbonates by reacting an 0,0-dialkyldithiophosphoric acid with an excess of carbonates of the said alkalies Me, which process comprises first preparing the 0,0-dialkyldithiophosphoric acid by reacting phosphorus pentasulfide with an alcohol ROH, the alcohol being used in an excess of between 5 and 15 weight percent, based on the stoichiometric quantity needed to produce the 0,0-dialkyldithiophosphoric acid, then heating the resulting crude 0,0-dialkyldithiophosphoric acid over a period of between 0.5 and 4 hours under a pressure of between 1 and 200 mm mercury and at temperatures of between 20° and 120° C, introducing into the 0,0-dialkyldithiophosphoric acid so obtained at least one of the above alkali metal carbonates in dry powdery form so as to produce a mixture of alkali metal salt of 0,0-dialkyldithiophosphoric acid and excess alkali metal carbonate with an overall alkali metal carbonate content of between 10 and 30 weight percent, and subjecting resulting reaction product over a period of between 0.5 and 2 hours, under a pressure of between 1 and 100 mm mercury at temperatures of between 20° and 100° C.

2. The process as claimed in claim 1, wherein the crude acid is treated under a pressure of between 25 and 100 mm mercury and at temperatures of between 40° and 80° C.

3. The process as claimed in claim 1, wherein the alkali metal carbonate is introduced into the 0,0-dialkyldithiophosphoric acid as rapidly as the foaming carbonate permits.

4. The process as claimed in claim 1, wherein the 0,0-dialkyldithiophosphoric acid is neutralized with an excess of alkali metal carbonate so that the reaction product of alkali metal salt of the acid and alkali metal carbonate in excess contains between 20 and 25 weight percent alkali metal carbonate.

5. The process as claimed in claim 1, which comprises carrying out the preparation of the 0,0-dialkyldithiophosphoric acid in a vacuum mixer and adding the alkali metal carbonate into the resulting 0,0-dialkyldithiophosphoric acid in said vacuum mixer.

* * * * *